United States Patent
Thaler et al.

(10) Patent No.: US 8,697,173 B2
(45) Date of Patent: *Apr. 15, 2014

(54) PEANUT BUTTER WITH AN ORGANIC STABILIZER AND METHOD FOR MANUFACTURE THEREOF

(75) Inventors: Jeremy Thaler, Dansville, NY (US); Sandra Alexander, Dansville, NY (US); Elizabeth A. Blatz, Edgewater, FL (US); Darin Carlin, Nunda, NY (US); Peter Carpenter, Portageville, NY (US); Lorraine Eurhardt, Nunda, NY (US); Mark Galton, Nunda, NY (US); Ellen Halbert, Dansville, NY (US); Esther Hinrich, Dalton, NY (US); David Howe, Nunda, NY (US); Stephen Jones, Nunda, NY (US); Lloyd Kirwan, Nunda, NY (US); Constance Potter, Nunda, NY (US); Richard Wilkins, Hunt, NY (US); Linda Zangerle, Nunda, NY (US)

(73) Assignee: Once Again Nut Butter, Inc., Nunda, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,075

(22) Filed: Apr. 5, 2012

(65) Prior Publication Data

US 2012/0213908 A1  Aug. 23, 2012

Related U.S. Application Data

(63) Continuation of application No. 10/705,657, filed on Nov. 10, 2003, now Pat. No. 8,173,194.

(60) Provisional application No. 60/425,980, filed on Nov. 14, 2002.

(51) Int. Cl.
  *A23L 1/38* (2006.01)
(52) U.S. Cl.
  USPC ........... 426/633; 426/518; 426/519; 426/520; 426/601
(58) Field of Classification Search
  USPC .................. 426/633, 601, 518, 519, 520
  See application file for complete search history.

(56) References Cited

U.S. PATENT DOCUMENTS

| | | |
|---|---|---|
| 2,079,288 A | 5/1937 | Hoffman |
| 2,560,509 A | 7/1951 | Harris et al. |
| 2,688,554 A | 9/1954 | Avers |
| 3,882,254 A | 5/1975 | Gooding |

(Continued)

OTHER PUBLICATIONS

Baileys Industrial Oil and Fat Products, vol. 106, (6th Ed.), John Wiley & Sons, 2005, pp. 159-171.
Rbombauer,Irma, et al. Joy of Cooking, 1975, The Bobbs-Merrill Co., Inc. Macmillan, Inc., N.Y., p. 564.
Hinds, M.J.; Unhydrogenated Palm Oil as a Stabilizer for Peanut Butter, Journal of Food Science, vol. 59, No. 4, 1994.

(Continued)

*Primary Examiner* — Helen F Heggestad
(74) *Attorney, Agent, or Firm* — Duane C. Basch; Basch & Nickerson LLP

(57) ABSTRACT

The present invention is directed to a novel organic peanut butter formulation and method for production. The peanut butter includes an organic, non-hydrogenated palm stearin oil stabilizing agent that reduces or prevents separation of oils from the peanut butter during storage. Peanut butter incorporating the palm oil, methods for manufacturing the peanut butter, and foods incorporating the peanut butter are also disclosed.

17 Claims, 1 Drawing Sheet

(56) References Cited

U.S. PATENT DOCUMENTS

| | | |
|---|---|---|
| 4,143,176 A | 3/1979 | Krisinski et al. |
| 5,962,064 A | 10/1999 | Perlman |
| 6,312,754 B1 | 11/2001 | Wong |
| 6,447,833 B1 | 9/2002 | Widlak |
| 6,528,104 B1 | 3/2003 | Jindra et al. |
| 6,703,064 B1 | 3/2004 | Milley |
| 6,756,070 B1 | 6/2004 | Milley |
| 6,982,101 B2 | 1/2006 | Liu et al. |
| 8,173,194 B2 * | 5/2012 | Thaler et al. ............ 426/633 |
| 2006/0045938 A1 | 3/2006 | Slesinski et al. |

OTHER PUBLICATIONS

Sensory and Physical Properties of Peanut Butter Treated With Palm Oil and Hydrogenated Vegetable Oil to Prevent Oil Separation Journal of Food Science, vol. 65, p. 173, Jan. 2000.

American Classic Organic Peanut Butter, Made on Sep. 18, 2002, Once Again Nut Butter, PO Box 429, Nunda, NY 14517888-800-8075; Info@Onceagainnutbutter, a Label.

The Prosecution History as of Apr. 4, 2012 for U.S. Appl. No. 10/705,657, filed Nov. 10, 2003, Published May 20, 2004, as US 2004-0096567 A1; Inventor: Jeremy Thaler et al.

* cited by examiner

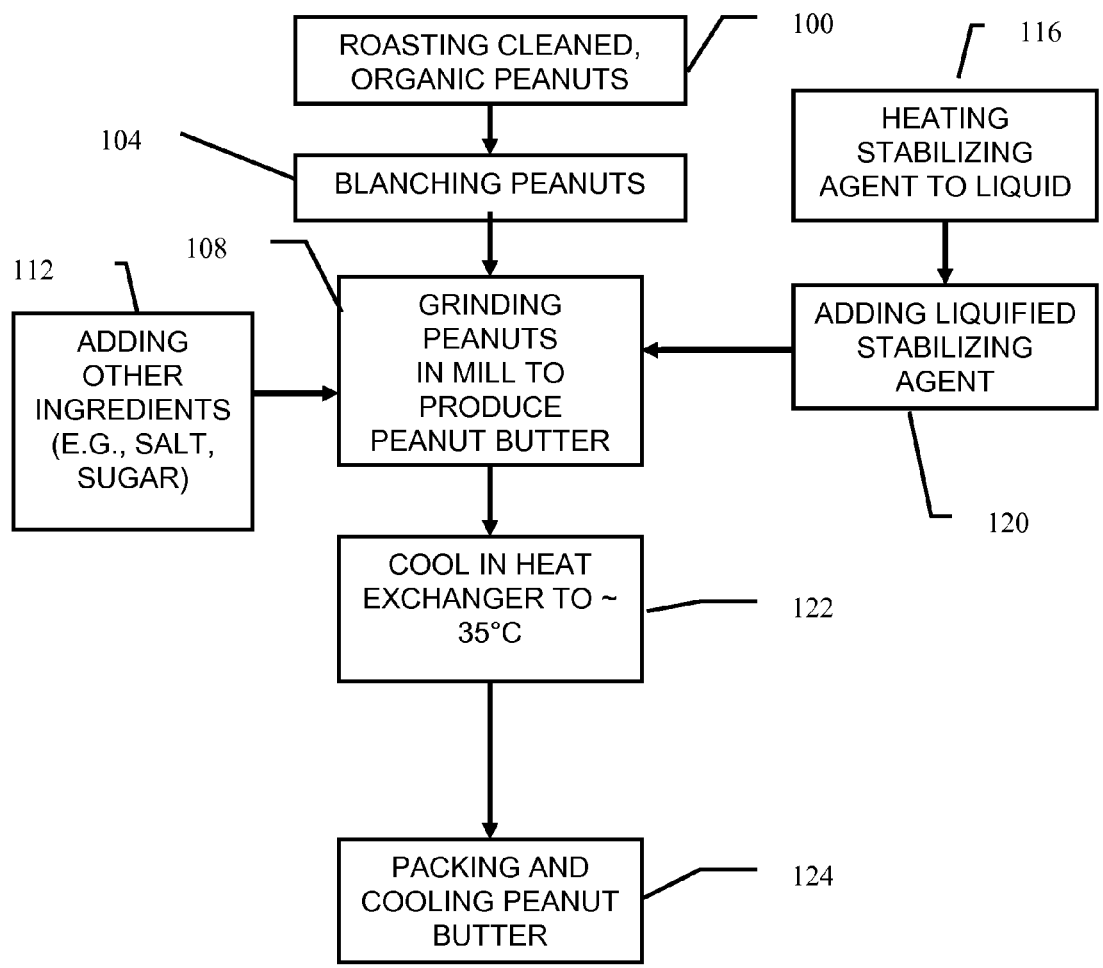

PEANUT BUTTER WITH AN ORGANIC STABILIZER AND METHOD FOR MANUFACTURE THEREOF

This application is a continuation of, and claims priority from, U.S. patent application Ser. No. 10/705,657 for "PEANUT BUTTER WITH AN ORGANIC STABILIZER AND METHOD FOR MANUFACTURE THEREOF," by Thaler et al. filed Nov. 10, 2003, and further claims priority from Provisional Application 60/425,980 for "PEANUT BUTTER WITH AN ORGANIC STABILIZER AND METHOD FOR MANUFACTURE THEREOF," by Thaler et al., filed Nov. 14, 2002, both of which are hereby incorporated by reference in their entirety.

This invention relates generally to peanut or nut butters and methods of manufacture, and more particularly to the manufacture of organic, or all-natural ingredient, peanut butters with organic stabilizers to prevent the separation of oils in the peanut butters and foods made therefrom.

BACKGROUND AND SUMMARY OF THE INVENTION

As is well known, peanut butter consists of a mixture of ground, roasted peanuts, oils or fats, and often one or more sweetening agents and salt. The general process of manufacturing peanut butter is well known. However, in the production of organic peanut butters, particularly those free of hydrogenated or partially hydrogenated fats, a common problem faced by manufacturers is that the product tends to separate after manufacture—where the oils present in the peanut butter rise to the top of the product over time. In some cases, organic peanut butter package labels may reflect a very short shelf life in order to maintain its appeal to consumers who dislike the separated oil. Alternatively, users of organic peanut butters may either stir or blend the contents before use or store them at reduced temperatures (refrigerated) to prevent or slow the separation process.

As noted, during the storage of peanut butter a layer of liquid oil tends to form on the top of the product. This tendency may be overcome to some extent by the addition of stabilizers or stabilizing agents such as monoglycerides and edible lipids, often consisting of high melting point fats and oils such as partially or completely hydrogenated fats or oils as commonly practiced by many peanut butter manufacturers. It is known that many such stabilizers form a crystalline structure when cooled, where the structure entraps free oil, preventing it from separating from the ground peanut particles.

With increased attention by consumers to health and particular food sources, the demand for organic peanut butter has also increased. However, the above-noted oil separation problems are typically present in organic peanut butter blends that do not employ some form of stabilizer. Accordingly, in order to provide discerning consumers with an organic peanut butter that has the consistency and appearance of conventional peanut butters (e.g., non-organic brands), the present invention is directed to an improved peanut butter formula and method of manufacturing. It is, therefore, an object of the present invention to provide an improved organic peanut butter having a stabilizing agent that, when incorporated into peanut butter, will yield a product having improved or longer-term storage stability including reduced oil separation.

One problem solved by the present invention is a technical problem caused by government regulations that impose standards on the food industry, in particular 21 CFR 164.150 and the nature of the stabilizer used. The Code of Federal Regulations (CFR) defines "peanut butter" as at least 90% peanuts and no more than 55% total fats. In order to create an organic peanut butter that emulates what is considered to be 'regular' store peanut butter in all its characteristics (appearance, taste and mechanical functionality), and one that could be labeled as "peanut butter" the present invention required considerable experimental effort. For example, in one formulation produced in accordance with the present invention the peanut content is 90.3 g per hundred or 90.3%, very close to the minimum. At the other end the total fat had to be very closely controlled. In other words, the fat in the peanuts plus 6 grams of added fat in the form or organic palm oil, is 15.78 grams per 30 gram serving. This results in a 52.6% fat content. This pushes toward the 55% limit. Accordingly, the present invention is able to achieve "peanut butter" within specified governmental limits, while eliminating the need for hydrogenated fats as stabilizers.

In accordance with the present invention, there is provided a peanut butter comprising: organically grown, dry-roasted, ground peanuts; and from about 5 wt % to about 7 wt % of a non-hydrogenated, vegetable oil.

In accordance with another aspect of the present invention, there is provided a method for manufacturing peanut butter comprising the steps of: (a) grinding organically grown, dry-roasted, ground peanuts in a mill; (b) combining, during milling or in a second milling operation, ingredients comprising from about 5% to about 7% by combined weight of non-hydrogenated oil, said combining producing a heated mixture with a temperature at least as high to maintain the oil in a liquid state; and (c) cooling the heated mixture produced in step (b) to a temperature sufficiently low to produce a dispensable mixture.

One aspect of the invention deals with a basic problem in the manufacture of peanut butters, and more particularly the manufacture of organic peanut butters. This aspect is further based on the discovery of a technique that alleviates this problem. The technique employs organic, non-hydrogenated vegetable oils as a stabilizing agent—particularly palm oil.

The technique described above is advantageous because it is a cost-effect and completely organic method of producing a peanut butter that is resistant to oil separation. As a result of the invention, organic peanut butter may be made in a manner that produces a consumer-acceptable product.

BRIEF DESCRIPTION OF THE DRAWING

FIG. 1 is a flow chart depicting a general process used in accordance with an embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. As used herein, the term "peanut butter" is understood to include the peanut butters as defined under 21 CFR .§164.150 Peanut butter, as well as similarly prepared foodstuffs including, for example, peanut or nut spreads, nut butters, and peanut butter cracker sandwiches, candies, and baked goods.

In one embodiment, the present invention relates to a peanut butter comprising organically grown, dry-roasted, ground and blanched peanuts, and from about 5 weight percent (wt %) to about 7 weight percent of a non-hydrogenated organic oil.

In a preferred embodiment, the non-hydrogenated organic oil acts as a stabilizing agent for the peanut butter and comprises substantially non-hydrogenated edible oil such as palm oil. More specifically, the palm oil that is preferred is described as Organic Palm Stearin 49C, sold by Spectrum Organic Products, Inc. (Item #130897), although alternative organic palm oil products made by Spectrum and other suppliers may be substituted as equivalents. The organic palm stearin oil is derived from the fleshy fruit of the tropical spineless palm tree, *Elaesis guineensis*. The following are typical properties of the oil:

| | |
|---|---|
| Specific Gravity (AOCS Cc 10a-25) | 0.890-0.910 |
| Initial Peroxide Value (AOCS Cd 8b-90) | 1.0 Max. |
| Moisture (AOCS Ca 2e-55) | 0.1 Max. |
| Melting Point (° C.) | 44-55 |
| Free Fatty Acid (% of oleic) | 0.08% Max. |

Furthermore, the organic palm oil preferably has a melting point of between 50° C. to 60° C. and preferably about 55° C.

In a preferred embodiment, the peanut butter additionally comprises from 0 wt % to about 3.5 wt % salt (Flour Salt MTI) and from 0 wt % to about 10 wt % of sweetener in the form of unrefined organic cane sugar. More preferably the peanut butter comprises from 0 wt % to about 2 wt % salt (Flour Salt MTI) and from 0 wt % to about 5 wt % of sweetener. The sweetener may also include other sweeteners such as sucrose, dextrose, fructose, honey, molasses, corn syrup, lactose, maltose and maltose syrup, which may or may not be derived from organic sources, and possibly artificial sweeteners, for example, aspartame, saccharine and cyclamate.

In another embodiment, the present invention relates to a method for manufacturing peanut butter comprising the steps of:

(a) grinding organically grown, dry-roasted, ground peanuts in a mill;
(b) combining, during milling or in a second milling operation, ingredients comprising from about 5% to about 7% by combined weight of an organic, non-hydrogenated oil, said combining producing a heated mixture with a temperature at least as high to maintain the oil in a liquid state; and
(c) cooling the heated mixture produced in step (b) to a temperature sufficiently low to produce a dispensable mixture.

In a preferred embodiment, the above-described method further includes a combining step that occurs concurrently with the grinding step in the mill, and wherein the organic, non-hydrogenated oil is dispensed into the mill.

In a further embodiment, the organic, non-hydrogenated oil is dispensed into a mixture of milled peanuts at a temperature of about 50° C. to about 60° C., and more specifically at a temperature of about 55° C.

More specifically, referring to the flow chart of FIG. 1, the process for preparing a peanut butter in accordance with the present invention includes first cleaning and roasting organic peanuts as depicted by step 100. In one embodiment, the peanuts are preferably Valencia peanuts grown organically in accordance with USDA (United States Dept of Agriculture), OCIA (Organic Crop Improvement Association), OTCO (Oregon Tilth Inc) and other standards. Roasting the peanuts is accomplished using an Aeroglide continuous belt convection oven roaster, operated to produce 775 kg/hour. Roasting is controlled so as to occur over a temperature range of about 150° C. to about 155° C.

Subsequently, in step 104, the peanuts are blanched to remove the skins therefrom. Blanching is accomplished using a model 341B manufactured by Cantrell International. A significant note on blanching, all blanchers remove the germ or heart from the peanut along with the skin. In a preferred embodiment the process uses a non-traditional method and sets the blancher to return the germ/hearts back into the flow of peanuts going to the mill.

Once prepared, the peanuts and all the other ingredients are then introduced into a mill, such as a Bauer 'Style 248 A18' peanut butter mill, at step 108, where they are ground at a rate of about 1000 kg/hour. It is believed to be preferable, in the grinding carried out in the mill, to maintain a slight coarseness to the peanut butter texture in order to further reduce the propensity for oil separation. The range of particle size is preferably between about 10 to about 15 μm. During the grinding process, as illustrated in FIG. 1, step 112 reflects the addition of salt and organic sugar to flavor and sweeten the peanut butter.

Steps 116 and 120 reflect the preparation and addition of the palm oil stabilizing agent to the peanut butter mix. In accordance with a preferred embodiment of the present invention, the palm oil is heated prior to being introduced into the mill for combining with the ground peanuts. In this manner, the palm oil is believed to be more thoroughly mixed so as to be completely dispersed within the peanut butter. The liquid palm oil is then added to the mix by a metering mechanism such as a pump with an accuracy of 7 ml (approx. 1%), although it will be appreciated that alternative methods may be used to dispense specific quantities of the palm oil to the mix.

In one embodiment of the invention, the palm oil is heated, at step 116 to a temperature of between about 50° C. to about 55° C. before dispensing. Once the palm oil and other ingredients are combined thoroughly, during milling or in a second milling operation, they exit the mill and are collected in a stainless steel reservoir and pumped from the bottom of the reservoir into a scraped wall heat exchanger (Step 122), where the temperature of the peanut butter is reduced to 35° C. The cooled peanut butter is then pumped to a filling station and into jars. The peanut butter is preferably at a temperature between about 35° C. and about 49° C. during the pumping and filling stages to assure that it may be pumped. Subsequently, the peanut butter is packaged and cooled, step 124, as is well known in the industry.

The present invention is now further described with respect to the following non-limiting examples:

Roasted, blanched, cleaned organic peanuts were ground together with the additional ingredients listed in the tables below, including various levels of non-hydrogenated organic palm oil as a stabilizing agent. The palm oil was pre-heated and then dispensed into the mix during grinding. During the grinding process the temperature of the mixture may approach temperatures of about 80° C., which is sufficient to thoroughly mix the palm oil with the other ingredients to produce a peanut butter. Subsequently, the peanut butter was dispensed into jars and allowed to cool. The jars of peanut butter were then allowed to equalize to room temperature.

A) Peanut Butter Prepared with 4 Wt % Non-Hydrogenated Organic Palm Oil (Spectrum Stearin 49C).

TABLE A

Run: 100 LB

| Ingredients | Weight LB | Weight-Percent (wt %) |
|---|---|---|
| Organic Palm Oil Stearin, 51C-55C | 4.10 LB | 4.10% |
| Organic Cane Sugar, granulated | 2.16 LB | 2.16% |
| Flour Salt | 0.43 LB | 0.43% |
| Organic Blanched Valencia Peanuts, germ back, dry roast | 93.31 LB | 93.31% |
| | 100 LB | 100% |

B) Peanut Butter Prepared with 5 Wt % Non-Hydrogenated Organic Palm Oil (Spectrum Stearin 49C).

TABLE B

Run: 100 LB

| Ingredients | Weight | Weight-Percent (wt %) |
|---|---|---|
| Organic Palm Oil Stearin, 51C-55C | 5.07 LB | 5.07% |
| Organic Cane Sugar, granulated | 2.14 LB | 2.14% |
| Flour Salt | 0.43 LB | 0.43% |
| Organic Blanched Valencia Peanuts, germ back, dry roast | 92.36 LB | 92.36% |
| | 100 LB | 100% |

C) Peanut Butter Prepared with 6 Wt % Non-Hydrogenated Organic Palm Oil (Spectrum Stearin 49C).

TABLE C

Run: 300 LB

| Ingredients | Weight | Weight-Percent (wt %) |
|---|---|---|
| Organic Palm Oil Stearin, 51C-55C | 6.03 LB | 6.03% |
| Organic Cane Sugar, granulated | 2.12 LB | 2.12% |
| Flour Salt | 0.42 LB | 0.42% |
| Organic Blanched Valencia Peanuts, germ back, dry roast | 91.43 LB | 91.43% |
| | 100 LB | 100% |

Observations included comments that despite the problems experienced with inconsistency of results there is an overall slight jelling/hardening of the test samples. Formulations appear to be inaccurate. Independent flow tests were then run on oil and salt. Mill runs consistently 1080 LB hour no matter what the content, oil does not fill in spaces between peanuts to give a higher production rate.

A second set of trials were then conducted as reflected by the following summaries in table form:

D) Peanut Butter Prepared with 2.5 Wt % Non-Hydrogenated Organic Palm Oil (Spectrum Stearin 49C).

TABLE D

Run: 75+ LB

| Ingredients | Weight | Weight-Percent (wt %) |
|---|---|---|
| Organic Palm Oil Stearin, 51C-55C | 2.5 LB | 2.5% |
| Organic Cane Sugar, granulated | 3.22 LB | 3.22% |
| Flour Salt | 0.43 LB | 0.43% |

TABLE D-continued

Run: 75+ LB

| Ingredients | Weight | Weight-Percent (wt %) |
|---|---|---|
| Organic Blanched Valencia Peanuts, germ back, dry roast | 94.3 LB | 94.3% |
| | 100 LB | 100% |

E) Peanut Butter Prepared with 3 Wt % Non-Hydrogenated Organic Palm Oil (Spectrum Stearin 49C).

TABLE E

Run: 450 LB

| Ingredients | Weight | Weight-Percent (wt %) |
|---|---|---|
| Organic Palm Oil Stearin, 51C-55C | 3.22 LB | 3.22% |
| Organic Cane Sugar, granulated | 3.22 LB | 3.22% |
| Flour Salt | 1.07 LB | 1.07% |
| Organic Blanched Valencia Peanuts, germ back, dry roast | 92.49 LB | 92.49% |
| | 100 LB | 100% |

F) Peanut Butter Prepared with 4 Wt % Non-Hydrogenated Organic Palm Oil (Spectrum Stearin 49C).

TABLE F

Run: 605 LB

| Ingredients | Weight | Weight-Percent (wt %) |
|---|---|---|
| Organic Palm Oil Stearin, 51C-55C | 4.34 LB | 4.34% |
| Organic Cane Sugar, granulated | 3.22 LB | 3.22% |
| Flour Salt | 1.07 LB | 1.07% |
| Organic Blanched Valencia Peanuts, germ back, dry roast | 91.37 LB | 91.37% |
| | 100 LB | 100% |

G) Peanut Butter Prepared with 5 Wt % Non-Hydrogenated Organic Palm Oil (Spectrum Stearin 49C).

TABLE G

Run: 687 LB

| Ingredients | Weight | Weight-Percent (wt %) |
|---|---|---|
| Organic Palm Oil Stearin, 51C-55C | 5 LB | 5% |
| Organic Cane Sugar, granulated | 3.22 LB | 3.22% |
| Flour Salt | 1.07 LB | 1.07% |
| Organic Blanched Valencia Peanuts, germ back, dry roast | 90.71 LB | 90.71% |
| | 100 LB | 100% |

Observations relative to runs set forth in Tables D-G: believed appropriate to focus on higher percentages of palm oil addition. Still working on resolving problems with oil delivery. Definite decline over the length of the butter run. Pump settings are proper. However 6% or 6+%, if possible, look to be close to what is desired. Also the salt and sugar not staying uniformly mixed in the feed hopper. Need separate feeders for salt and sugar.

Subsequently, a third trial was conducted as reflected in the following tables:

H) Peanut Butter Prepared with 6 Wt % Non-Hydrogenated Organic Palm Oil (Spectrum Stearin 49C).

TABLE H

Run: 1800 LB

| Ingredients | Weight | Weight-Percent (wt %) |
| --- | --- | --- |
| Organic Palm Oil Stearin, 51C-55C | 6 LB | 6% |
| Organic Cane Sugar, granulated | 3 LB | 3% |
| Flour Salt | 0.71 LB | 0.71% |
| Organic Blanched Valencia Peanuts, germ back, dry roast | 90.29 LB | 90.29% |
| | 100 LB | 100% |

G') Peanut Butter Prepared with 5 Wt % Non-Hydrogenated Organic Palm Oil (Spectrum Stearin 49C). RETEST of G Formulation.

TABLE G'

Run: 687 LB

| Ingredients | Weight | Weight-Percent (wt %) |
| --- | --- | --- |
| Organic Palm Oil Stearin, 51C-55C | 5 LB | 5% |
| Organic Cane Sugar, granulated | 3.22 LB | 3.22% |
| Flour Salt | 1.07 LB | 1.07% |
| Organic Blanched Valencia Peanuts, germ back, dry roast | 90.71 LB | 90.71% |
| | 100 LB | 100% |

The following observations were made: installation of the new feeder for the sugar yields a very consistent product compared to earlier run of the retest of G will give a good comparison. The oil problem was at the connection to the mill. Switching oil feed to main throat solves problem. This run of 125+ cases makes calculations easier. Salt is at seven-tenths of a percent. Hard to do with precision on a run of this size. Six percent pushes the allowable limits. In production will move as close to seven percent as possible. Only can be done in runs or 100,000 Lbs+.

After 10, 20, 30, 60, 90, 120, and 180 days the stored peanut butter jars were visually inspected for the development of free oil on the surface of the peanut butter. In addition, the consistency (meaning firmness, viscosity, density, etc.) of the peanut butter was characterized using the following test:

A jar of stored peanut butter was opened and a butter-knife inserted vertically, blade-down, into the jar. The knife was left, unsupported. The consistency of the peanut butter was characterized by the time over which the knife would remain vertical in the jar. Spread tests on items such as bread, crackers, and celery were also conducted to verify the functionality of each formulation. Also did comparisons against well-known peanut butter brands including Jiff, Skippy and Peter Pan. Texture was also tested with a Precision Gage and Tool Co. peanut butter Fineness of Grind Gage model PB-30.

Additionally, visual and taste-testing of the stored peanut butter was conducted to assess the impact of the amount of palm oil used in preparing the peanut butter. These peanut butters were processed, stored and tested as described above. The visual observation indicated no significant separation.

In recapitulation, the present invention is directed to a novel organic peanut butter formulation and method for its production. The peanut butter preferably includes an organic stabilizing agent, such as palm oil, that reduces or prevents separation of oils from the peanut butter during storage. Peanut butter incorporating the palm oil, methods for manufacturing the peanut butter, and foods incorporating the peanut butter are also disclosed.

It is, therefore, apparent that there has been provided, in accordance with the present invention, a novel organic peanut butter formulation and method for its production. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for manufacturing organic peanut butter, comprising:
grinding organically grown, dry-roasted, peanuts in a mill including at least about 90 wt % of ground peanuts along with from about 5% to about 7% by combined weight of an organic, non-hydrogenated palm stearin oil at a temperature sufficient to maintain the palm stearin oil in a liquid state, to produce a mixture wherein a total fat concentration of the mixture is less than about 55 wt %; and
cooling said mixture to a temperature sufficiently low to resist subsequent separation of oil therefrom, said mixture having no free oil observed on the surface of the peanut butter after storage for at least 60 days.

2. The method of claim 1, wherein the organic, non-hydrogenated palm stearin oil is dispensed into a throat of the mill.

3. The method of claim 2, wherein the organic, non-hydrogenated palm stearin oil is preheated, before being dispensed into the mill, to a temperature less than about 60 degrees centigrade.

4. The method of claim 2, wherein the organic, non-hydrogenated palm stearin oil is preheated, before being dispensed into the mill, to a temperature in the range of about 50 degrees centigrade to about 55 degrees centigrade.

5. The method of claim 1, further comprising roasting the peanuts prior to grinding.

6. The method of claim 5, wherein roasting the peanuts occurs at a temperature within range of about 150 degrees centigrade to about 155 degrees centigrade.

7. The method of claim 6, further comprising blanching the peanuts, after roasting, to remove skins therefrom.

8. The method of claim 7, further comprising returning substantially all peanut germ, separated from the peanuts during blanching, into the peanuts before grinding.

9. The method of claim 7, further comprising:
collecting the heated mixture in a reservoir; and
pumping the heated mixture from a bottom of the reservoir, through a heat exchanger, to a filling station where it is dispensed into containers.

10. The method of claim 1, further comprising adding salt to the mixture.

11. The method of claim 1, further comprising adding a sweetener to the mixture.

12. The method of claim 11, wherein the sweetener includes unrefined, organic cane sugar.

13. The method of claim 11, wherein the sweetener is selected from the group consisting of: cane sugar, sucrose, dextrose, fructose, honey, molasses, corn syrup, lactose, maltose, and maltose syrup.

14. The method of claim 1, wherein peanut particles within the peanut butter have a size smaller than about 15 μm.

15. A method for manufacturing organic peanut butter, comprising:
grinding organically grown, dry-roasted, peanuts in a mill including at least about 90 wt % of ground peanuts along with from about 5% to about 7% by combined weight of an organic, non-hydrogenated palm stearin oil at a temperature sufficient to maintain the palm stearin oil in a liquid state, to produce a mixture wherein a total fat concentration of the mixture is less than about 55 wt %, wherein said grinding includes first and second milling operations; and cooling said mixture to a temperature sufficiently low to resist subsequent separation of oil therefrom, said mixture having no free oil observed on the surface of the peanut butter after storage for at least 60 days.

16. The method according to claim 15, wherein the organic, non-hydrogenated palm stearin oil is introduced to the ground peanuts during the first milling operation.

17. A method for manufacturing organic peanut butter, comprising:

grinding organically grown, dry-roasted, peanuts in a mill including at least about 90 wt % of ground peanuts along with from about 5% to about 7% by combined weight of an organic, non-hydrogenated palm stearin oil at a temperature sufficient to maintain the palm stearin oil in a liquid state, to produce a mixture wherein a total fat concentration of the mixture is less than about 55 wt %, wherein said grinding includes a first milling operation followed by a second milling operation; and cooling said mixture to a temperature sufficiently low to resist subsequent separation of oil therefrom, said mixture having no free oil observed on the surface of the peanut butter after storage for at least 60 days.

* * * * *